Dec. 16, 1941.	A. F. HENNINGER ET AL	2,266,037
ELECTRIC MOTOR APPARATUS
Filed Oct. 26, 1940
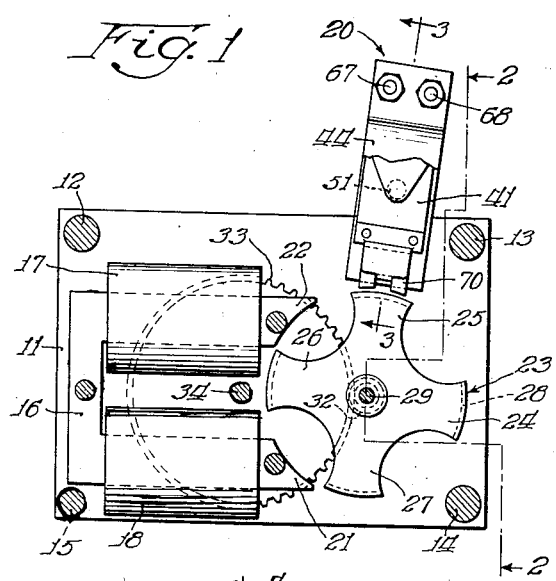
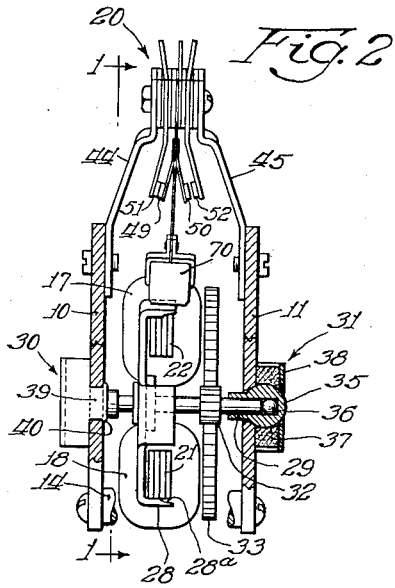
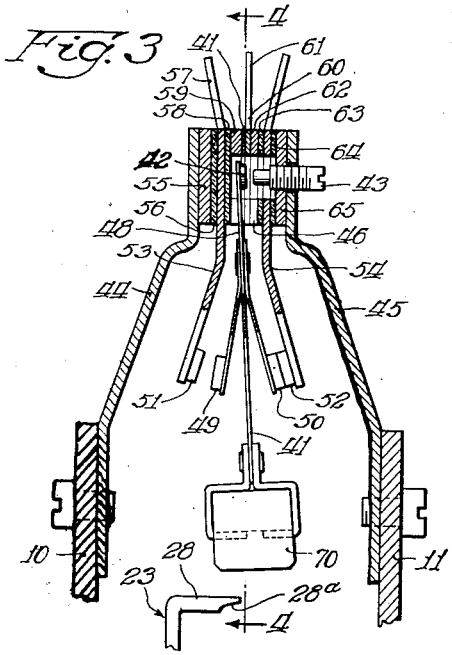
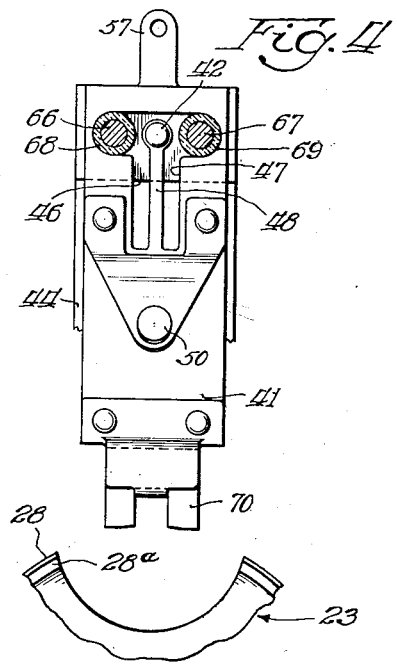
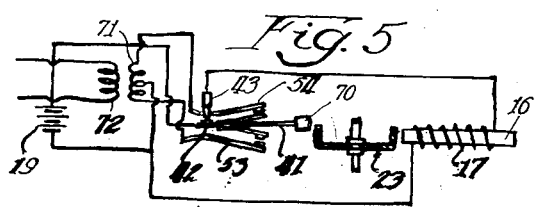
Inventors:
Andrew F. Henninger and
George D. Henninger
By:
Attys.

Patented Dec. 16, 1941

2,266,037

UNITED STATES PATENT OFFICE 2,266,037

ELECTRIC MOTOR APPARATUS

Andrew F. Henninger and George D. Henninger, Chicago, Ill.

Application October 26, 1940, Serial No. 362,992

8 Claims. (Cl. 172—36)

The present invention relates to apparatus for translating electrical energy into mechanical movement and has for its principal object the provision of a novel combination of instrumentalities for that purpose whereby a desired speed of operation of the mechanical movement may be obtained with a high degree of efficiency in the translation of electrical energy into mechanical movement.

The present invention contemplates an apparatus of the character described, which is preferably operated from a low voltage, direct current source of electrical energy such as a battery.

The invention also contemplates a self-starting apparatus which upon starting will assume and maintain a constant speed for all loads up to the maximum capacity or power of the apparatus.

More specifically it is an object of the present invention to provide in combination an electric motor and vibrating reed with apparatus whereby the rate of vibration of the reed determines the speed of the motor, and the motor itself acts to prevent over-reaching of the amplitude of vibration of the reed whereby continuously operating, constant speed, mechanical movement is obtained from a source of direct current, the speed being determined by the natural period of vibration of the reed itself.

The present invention also contemplates the functioning of the reed in this combination as an interrupter whereby current from the direct current source may be translated into a pulsating current of a frequency which is determined by the natural period of vibration of the reed.

The invention is embodied in an apparatus of the character described consisting essentially of an electric motor having a rotating armature and field poles arranged to attract said armature, together with a spring mounted vibrating reed. The reed is mounted to vibrate in an axial direction with respect to the armature. Said reed carries at its tip a permanent magnet arranged in cooperative relationship to the armature to cause the armature, when the motor is de-energized, to assume a position where it will be started instantaneously upon energization of the field poles of the motor. The vibrating reed carries a circuit closing contact which in the stopped position of the reed closes a point in the circuit of the energizing coil or coils for the poles of the motor due to the attraction of the permanent magnet by the armature of the motor. The reed is so situated that energy is stored in it by this attraction sufficient that upon rotation of the armature to remove the attracting part from its proximity to the permanent magnet the reed will then move the permanent magnet and will also break the circuit energizing the field poles of the motor. Re-energization of the motor occurs on the return movement of the reed.

The reed makes and breaks the direct current circuit to a transformer each time it vibrates, in addition to making and breaking the motor circuit. The effect of the armature poles on the magnet is to prevent overrunning of the reed in its vibration and it seems that the electro-magnet, by the force it does possess, acts to keep the reed from opening the motor circuit too quickly as the load increases so that more current through the motor merely increases the power without changing the speed.

The features and advantages of the present invention will appear more fully as the description proceeds, reference being had to the accompanying drawing wherein a preferred form of the invention is shown. It is to be understood, however, that the drawing and description are illustrative only and are not to be taken as limiting the invention, except insofar as it is limited by the claims.

In the drawing:

Fig. 1 is a view taken substantially on the line 1—1 of Fig. 2;

Fig. 2 is a sectional view taken substantially on the line 2—2 of Fig. 1;

Fig. 3 is an enlarged fragmentary sectional view taken on the line 3—3 of Fig. 1;

Fig. 4 is a fragmentary sectional view taken on the line 4—4 of Fig. 3, with the frame parts left off; and Fig. 5 is a diagrammatic view illustrating the wiring connections for the apparatus.

Referring now in detail to the drawing, the present invention is embodied in a motor apparatus which comprises two spaced frame plates 10 and 11, which plates are held in spaced relation by spacing rods 12, 13, 14 and 15. Between the plates 10 and 11 there is mounted a stationary core 16 which is preferably constructed of a plurality of iron laminations. This core is energized by means of field coils 17 and 18 which as shown in Fig. 5 are adapted to be energized from a battery 19 under the control of a circuit opening and closing device 20.

The core 16 is substantially U-shaped and terminates in two pole faces 21 and 22 arranged adjacent the path of rotation of an armature 23. The armature 23 comprises a soft iron plate having a plurality of radially extending spokes 24, 25, 26 and 27, each spoke terminating in a curved pole piece 28 which is adapted to rotate in close proximity to the pole faces 21 and 22 of the core 16. It will be understood that the coils 17 and 18 are used to energize the pole faces 21 and 22 which are angularly spaced with respect to the axis of the armature in amounts substantially equal to the angular spacing of the spokes 24, 25, 26 and 27. Thus both pole faces 21 and 22 will attract the corresponding pole pieces 28 of two adjacent spokes. The pole pieces 28 are cut away at 28a.

The armature 23 is carried by a shaft 29, this shaft being journalled in suitable bearings 30 and 31 in the plates 10 and 11. The shaft 29 has a pinion 32 thereon which meshes with a large gear 33. The gear 33 is carried by a shaft 34 which is also journalled in the frame plates 10 and 11 by bearings similar in all respects to the bearings 30 and 31.

For the construction of the bearings please refer to Fig. 2 where the bearing 31 is shown in section. Each bearing comprises a body 35 constructed of a porous oil filled metal such as bronze, this body being provided with a bore to receive the shaft 29, and with a small ball bearing 36 acting as an end thrust bearing. The body 35 is surrounded by a fibrous ring 37 of felt which is filled with oil so as to saturate the body 35 and keep it supplied with oil. A cover bracket 38 holds the body 35 in place. This bracket has small projections such as indicated at 39 on the bearing 30, the projections extending through the frame plates 10 and 11 and being crimped over as indicated at 40 to hold the bracket in place.

The circuit opening and closing device 20 comprises a vibrating reed 41 having a contact 42 thereon, which contact is adapted to engage an adjustable stationary contact 43. The reed is carried by a framework consisting of two supporting arms 44 and 45 secured to the frame plates 10 and 11, respectively. The holes in the frame plates are larger than the screws which attach the arms to permit of adjustment. The reed is mounted between the arms 44 and 45 by means of a multiplicity of spacer elements cut out to provide a hollow area 46 in which the movable contact 42 swings.

As shown best in Figs. 3 and 4, the reed 41 comprises a spring which is cut out at 47 to provide an open section around an arm 48 which carries the contact 42. The arm 48 is mounted on the reed 41. This reed also carries two contact members 49 and 50 which are adapted to engage stationary contacts 51 and 52, respectively. The contacts 51 and 52 are carried on terminal strips 53 and 54, which terminal strips are also mounted between the arms 44 and 45. The construction is as follows: adjacent the arm 44 there is a spacer plate 55, then comes a sheet 56 of insulating material, then the terminal strip 53 with a projection 57 thereon for attaching conductors, next there is a strip 58 of insulating material, then a spacing strip 59 and then the vibrating reed 41. A terminal strip 60 bears against the reed 41 and is provided with an extension 61 for connecting a conductor thereto. The remainder of the assembly comprises a spacing strip 62, an insulating strip 63, the terminal strip 54, another insulating strip 64 and a spacer 65. Suitable screw bolts 66 and 67 extend through the assembly just described and clamp the parts together. These bolts have insulating sleeves 68 and 69 thereon, as appears from Fig. 4.

The vibrating reed 41 is provided with means whereby it determines the rate of rotation of the armature 23 and whereby the armature in turn imparts force to the reed to keep it vibrating and yet limits the amplitude of its vibration so as to prevent it becoming excessive.

The control means comprises a permanent magnet 70 which is mounted on the end of the vibrating reed 41 and in close proximity to the path of the pole pieces 28. The attraction of the permanent magnet 70 for the pole pieces 28 causes one of the pole pieces to always stop directly in front of the permanent magnet, as shown in Fig. 1, when the field coils 17 and 18 are de-energized. In this position the reed is pulled out of its normal resting place sufficiently to bring the contacts 42 and 43 into engagement. One of the contacts, for example the contact 42, is connected through the reed and its terminal 61 to one side of the battery 19. The other contact 43 is connected by a suitable lead to the other side of the battery 19 through the coils 17 and 18 of the motor.

When a pole piece 28 is moved out of alignment with the permanent magnet 70 into the position shown in Fig. 4 for example, then the reed resumes its normal position and in fact swings past it due to the energy that was stored in it by the attraction of the magnet 70 for the armature. This in turn separates the contacts 42 and 43 and consequently breaks the energizing circuit for the coils 17 and 18. The inertia of the armature carries it into position to again attract the magnet 70 and thus close the circuit for the motor coils 17 and 18 whereupon the pole faces 21 and 22 will attract the armature and impart further rotation to it. In this way the armature is continually rotated.

As the reed 41 vibrates it makes and breaks the contacts 49, 51, 50, 52 as will be readily appreciated. This results in setting up, as shown by the wiring diagram in Fig. 5, a pulsating current through the primary coil 71 of a transformer, the secondary coil 72 of which may be used to energize any suitable device such for example as a gaseous conduction lamp.

The natural period of vibration of the reed 41 determines the rate at which it will energize and deenergize the coils 17 and 18. Each time it is attracted by an armature pole piece 28 the permanent magnet 70 stores up energy in the reed 41 so as to keep it vibrating. If, however, the reed vibrates too far the attraction of the magnet 70 for the armature pole piece 28 will retard the amplitude of vibration and thus limit the extent to which the reed can build up its own vibration. It will be noted that the permanent magnet is set so that it is about half way over the end of a pole piece 28 in normal resting position. Preferably the overlap should be a little less than one-half the width of the permanent magnet, then when the magnet is attracted by the pole piece in resting position of the motor, with the coils 17 and 18 de-energized, the magnet overlaps the pole piece a little more than one-half its width.

There is a resulting action due to this arrangement that is of particular importance in controlling the input of power to the motor to compensate for variable loads. If there is a tendency of the armature to lag due to increased load this means simply that the reed 41 vibrating at a constant rate will close its contacts 42 and 43 a little ahead of time insofar as the armature is concerned, thus causing the pole faces 21 and 22 to start pulling the armature and causing it to catch up or overcome its lag. The armature will tend to retard the return of the reed 41 under this condition until such time as it is moved out of the magnet-attracting position by the force exerted through the pole faces 21 and 22.

We have found the result to be that under varying load the current drain is heavier with increased load and lighter with decreased load, although the speed remains constant. The motor therefore is self-regulating, of constant speed, and maintains the vibrations of the reed within safe limits. It is obvious that by using a reed of the desired natural frequency any desired motor speed within reason can be obtained.

In the initial try-out of a motor embodying the present invention we have found it advisable to adjust the contact 43 with respect to the movable contact 42 in order to obtain the best operation. If the contacts are too close together then the rotor remains locked in place with two of its spokes opposite the field poles. If on the other hand the contacts are too far apart the pull given to the permanent magnet by the armature will not insure closing of the contacts and the motor will fail to start.

We find that the adjustment of the contact 43 is much less critical when the armature pole pieces 28 are cut away as shown at 28a. Evidently there is an initial tendency to pull the magnet farther out of neutral position with this construction than with the same pole piece minus the cut out 28a.

From the foregoing description it is believed that the construction and operation of this apparatus will be readily apparent to those skilled in this art.

Having thus described our invention, what we claim as new and desire to secure by Letters Patent is:

1. Apparatus of the character described, comprising the combination with a motor structure including a rotary armature and stationary field having cooperating poles, of a vibrating reed having a magnet thereon mounted adjacent to the path of said armature in position to attract an armature pole, and to be attracted by the armature pole out of natural resting position, the attraction of the magnet causing the armature, when the field is de-energized, to assume a position to be attracted and turned by the poles of said field upon energization of the field, said field poles being angularly spaced with respect to said magnet about the axis of the armature, whereby upon energization they rotate the armature out of position where attraction between its pole and the magnet holds the magnet out of natural resting position, and circuit making and breaking means for said motor field controlled by the reed and operable to close the circuit when the magnet is attracted out of normal position by said armature and to open the circuit when the reed swings back to normal position.

2. Apparatus of the character described, comprising the combination, with a motor structure having a rotary armature and stationary field provided with cooperating poles, of a spring mounted vibrating reed adapted to vibrate at a definite frequency and mounted to vibrate in a plane parallel to the armature axis, a magnet carried by said reed in proximity to the path of rotation of the armature but offset axially of the armature with respect to the pole portion thereof, whereby attraction of the magnet by a pole of the armature stores energy in said spring, and circuit control means for said motor field carried by said reed operable to close the circuit for the field when the magnet is attracted over a pole of the armature and to open the circuit when the spring swings the magnet in the opposite direction.

3. Apparatus of the character described, comprising the combination, with a motor structure having a rotary armature and stationary field provided with cooperating poles, of a spring mounted vibrating reed adapted to vibrate at a definite frequency and mounted to vibrate in a plane parallel to the armature axis, a magnet carried by said reed in proximity to the path of rotation of the armature but offset axially of the armature with respect to the pole portion thereof, whereby attraction of the magnet by a pole of the armature stores energy in said spring, circuit control means for said motor field carried by said reed operable to close the circuit for the field when the magnet is attracted over a pole of the armature and to open the circuit when the spring swings the magnet in the opposite direction, a direct current source for said field, a current consumption device connected to said source, and an interrupter in the circuit for said device comprising stationary contact means beside said reed and contact means carried by said reed to engage said stationary contact means.

4. Apparatus of the character described, comprising the combination, with a motor structure having a rotary armature and stationary field provided with cooperating poles, of a spring mounted vibrating reed adapted to vibrate at a definite frequency and mounted to vibrate in a plane parallel to the armature axis, a magnet carried by said reed in proximity to the path of rotation of the armature but offset axially of the armature with respect to the pole portion thereof, whereby attraction of the magnet by a pole of the armature stores energy in said spring, circuit control means for said motor field carried by said reed operable to close the circuit for the field when the magnet is attracted over a pole of the armature and to open the circuit when the spring swings the magnet in the opposite direction, a direct current source for said field, a current consumption device connected to said source, and an interrupter in the circuit for said device comprising stationary contacts on opposite sides of said reed and contact means on said reed for engaging said stationary contacts alternately as the reed vibrates.

5. Apparatus of the character described, comprising the combination with a motor structure including a rotary armature and stationary field having cooperating poles, of a permanent magnet positioned to attract the armature poles and bring the armature into position to be rotated by attraction of the field poles, and a spring mounted reed supporting said magnet and having circuit control means thereon for said field, the attraction between the magnet and armature limiting the amplitude of vibration of the reed.

6. Apparatus of the character described, comprising the combination with a motor structure including a rotary armature and stationary field having cooperating poles, of a permanent magnet positioned to attract the armature poles and bring the armature into position to be rotated by attraction of the field poles, and a spring mounted reed supporting said magnet and having circuit control means thereon for said field, the said reed being mounted to vibrate axially of the armature whereby the attraction between the magnet and armature limits the amplitude of vibration of the reed.

7. Apparatus of the character described, comprising the combination with a motor structure including a rotary armature and stationary field having cooperating poles, of a permanent magnet positioned to attract the armature poles and bring the armature into position to be rotated by attraction of the field poles, and a spring mounted reed supporting said magnet and having circuit control means thereon for said field, the said reed being mounted to vibrate axially of the armature and the said magnet being overlapped with but axially offset with respect to the center line of the armature poles whereby the attraction between the magnet and armature limits the amplitude of vibration of the reed.

8. Apparatus of the character described comprising the combination with a motor structure including a rotary armature and a stationary field, and an energizing circuit for said field, said armature and field having cooperating poles, of a vibratory reed, a magnet positioned adjacent to the path of said armature and connected with said reed so as to be attracted by and to attract an armature pole and to cause movement of the reed out of normal resting position in response to the magnet and pole attraction of each other, said field pole being angularly positioned with respect to the magnet about the armature axis, so as to rotate the armature when the field is energized out of position where attraction between it and the magnet causes movement of the reed out of natural resting position, and circuit control means operable by the movements of said reed to close the motor field circuit when the magnet is attracted and to open the motor field circuit when the armature pole has been moved by the attraction of the field pole away from the magnet.

ANDREW F. HENNINGER.
GEORGE D. HENNINGER.